T. DE FONTAINE.
GAS GENERATOR.
APPLICATION FILED DEC. 8, 1909.

987,618.

Patented Mar. 21, 1911.

2 SHEETS—SHEET 1.

Witnesses:

Inventor:
Theodor de Fontaine
by
Attorney.

UNITED STATES PATENT OFFICE.

THEODOR DE FONTAINE, OF HANOVER, GERMANY.

GAS-GENERATOR.

987,618.

Specification of Letters Patent.     Patented Mar. 21, 1911.

Application filed December 8, 1909. Serial No. 532,079.

*To all whom it may concern:*

Be it known that I, THEODOR DE FONTAINE, a subject of the German Emperor, residing at Hanover, in Germany, have invented certain new and useful Improvements in Gas-Generators, of which the following is a specification.

This invention relates to gas-generators and consists in improvements which apply more particularly to the blast and clinker-discharging apparatus, but include advantages relating to the construction, fixing and function of the hearth.

A construction embodying these improvements is shown in the annexed drawings, in which—

Figure 1:
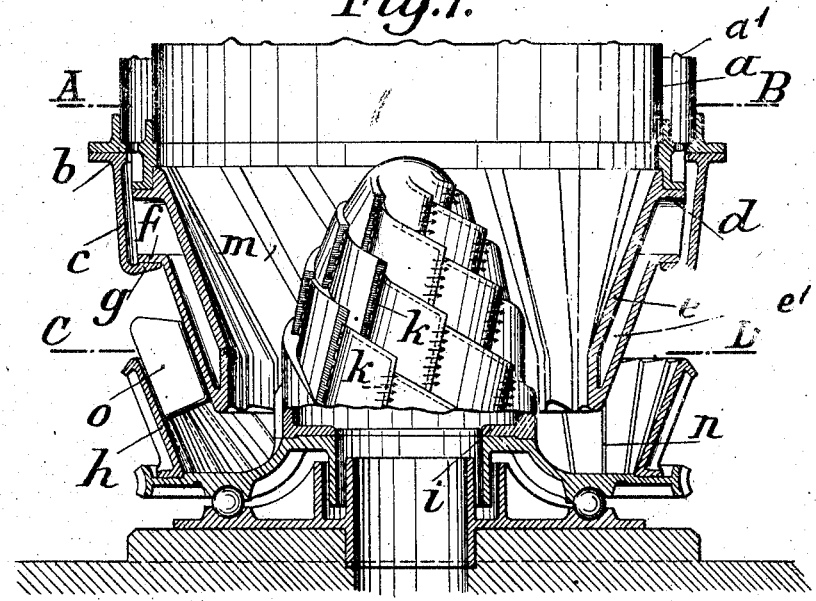
Figure 2:
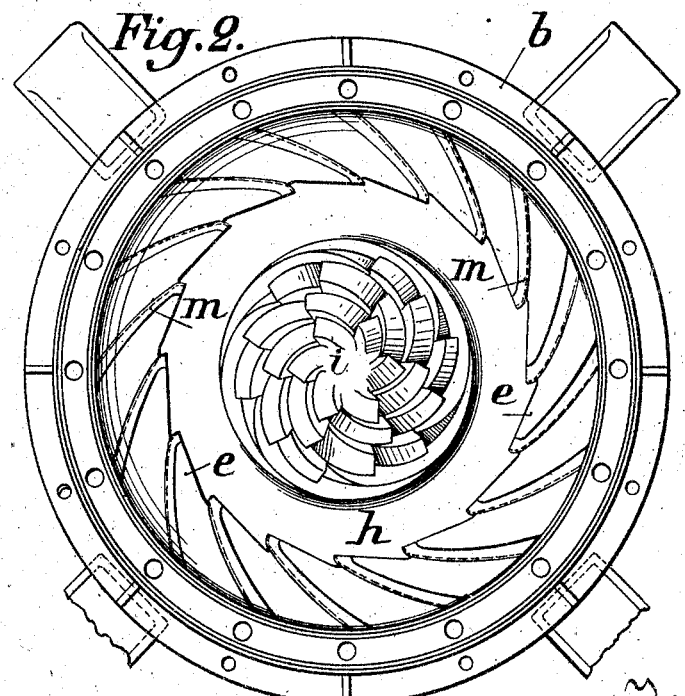
Figure 3:
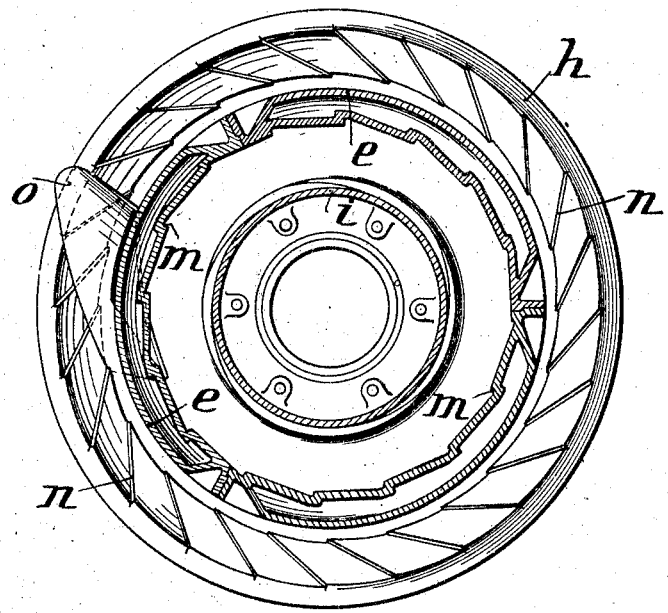

Figure 1 is a vertical section of the lower part of the generator, Fig. 2 being a section on the line A—B of Fig. 1, and Fig. 3 a section on the line C—D of Fig. 1.

In the drawing $a$ represents a portion of the body of the generator, which is cooled by means of a water-jacket $a^1$ and supported by a perforated flange ring $b$. The latter rests upon an annular support $c$. To the ring $b$ is fixed a flange $d$ of a double-walled, conical hearth $e$, which is made up of sections preferably three and has a flange $f$ resting upon a flange $g$ of the support $c$. The space $e^1$ between the walls of the hearth is in communication with the interior of the water-jacket $a^1$. It will be noted that the manner in which the hearth is supported and fixed allows of easily disconnecting and renewing the same.

The clinker-pan $h$, which is rotated in the known manner, supports a central blast-nozzle $i$, the orifices $k$ of which are at the ends of helicoidal excrescences formed on the circumferential surface of the nozzle. The faces of these excrescences, in which the orifices $k$ are formed, are inclined, *i. e.* recede from the top to the bottom, in order to prevent clogging of the orifices by clinkers. The ducts leading to the orifices are, however, horizontally directed, and the air discharged as indicated by the arrows in Fig. 1 is very uniformly distributed in the generator. The excrescences form vanes which, during the rotation of the nozzle, serve to break up the clinker and convey the same downward toward the pan. These rotary vanes co-act with fixed helical ribs or vanes $m$ formed on the inner surface of the conical hearth, the direction of the vanes $m$ being opposed to the direction of the excrescences. The nozzle forms as it were a complementary portion of the hearth, and affords, with the double wall $e$, a comparatively large bearing surface for the charge.

The wall of the pan $h$ is inclined at the same angle as the hearth, and has inclined ribs or vanes $n$ formed on its inner surface, to co-act with a fixed scraper or abutment $o$, for the purpose of discharging the clinker.

What I claim as my invention and desire to secure by Letters Patent of the United States is:—

1. In a gas-generator of the class described, in combination with a hearth, and a slag-pan of a central rotary blast-nozzle, a series of helical excrescences formed on the outer surface of said nozzle and formed with air discharge-orifices in faces which recede from top to bottom, a series of ribs or veins formed on the inner surface of the hearth and adapted to coact with the excrescences on said nozzle to break up the clinker and convey the same to the slag-pan.

2. In a gas-generator of the class described, in combination with a hearth and a rotary blast nozzle, of a slag-pan having a conical wall and a series of helical ribs or veins formed on the inner surface of said wall, said slag-pan adapted to rotate with said blast nozzle, and a fixed scraper coacting with said slag-pan to discharge the clinker therefrom.

In witness whereof I have signed this specification in the presence of two witnesses.

THEODOR DE FONTAINE.

Witnesses:
M. BEHNE,
R. PAUL THOMPSON.